United States Patent [19]
Hills et al.

[11] Patent Number: 5,681,073
[45] Date of Patent: Oct. 28, 1997

[54] SUPPLEMENTARY SUN SHADE

[75] Inventors: Marvin Hills, Grand Junction, Colo.; James Flippin, Clearwater, Kans.

[73] Assignee: Marvin D. Hills, Grand Junction, Colo.

[21] Appl. No.: 706,733

[22] Filed: Sep. 9, 1996

[51] Int. Cl.⁶ ........................................ B60J 3/02
[52] U.S. Cl. .......................................... 296/97.6
[58] Field of Search .................. 296/97.1, 97.6, 296/97.7, 97.9

[56] References Cited

U.S. PATENT DOCUMENTS

| | | | |
|---|---|---|---|
| 1,987,259 | 1/1935 | Koehler | 296/97.7 X |
| 4,023,855 | 5/1977 | Janata et al. | 296/97.6 |

*Primary Examiner*—Andrew C. Pike

[57] ABSTRACT

The disclosed supplementary sun shade is an assembly which attaches loosely to the vehicle sun visor by utilizing a strip of hooked fastening tape extending laterally across the top of the assembly which grips the sun visor fabric and maintains the selected position. The sun blocking panel of the sun shade is of a flexible material which permits the shade to hang vertically, and is generally 5 inches in the lateral dimension and 3 inches in the vertical dimension which allows blocking of the sun's direct rays while allowing minimum view obstruction of the local environment. A strip of heavier and less flexible material extends laterally across the lower edge of the supplementary sun shade for maintaining the shape of the supplementary sun shade and to aid in maintaining a vertical attitude of the supplementary sun shade while deployed.

5 Claims, 1 Drawing Sheet

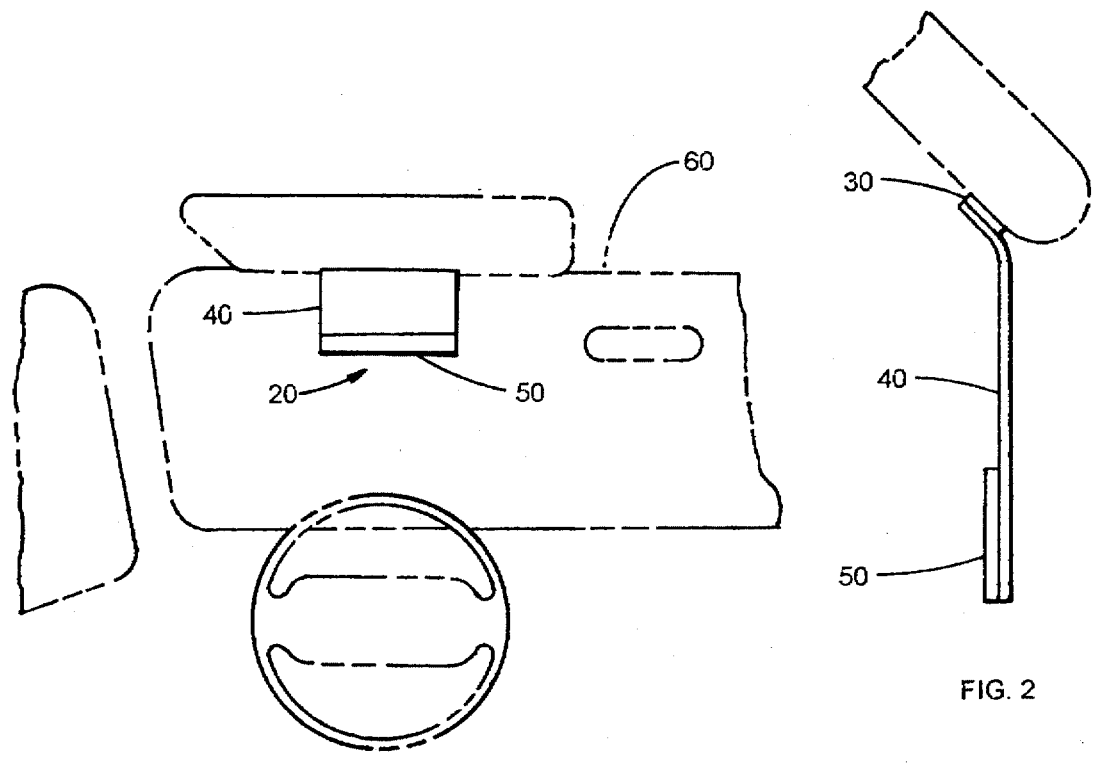
FIG. 1
FIG. 2
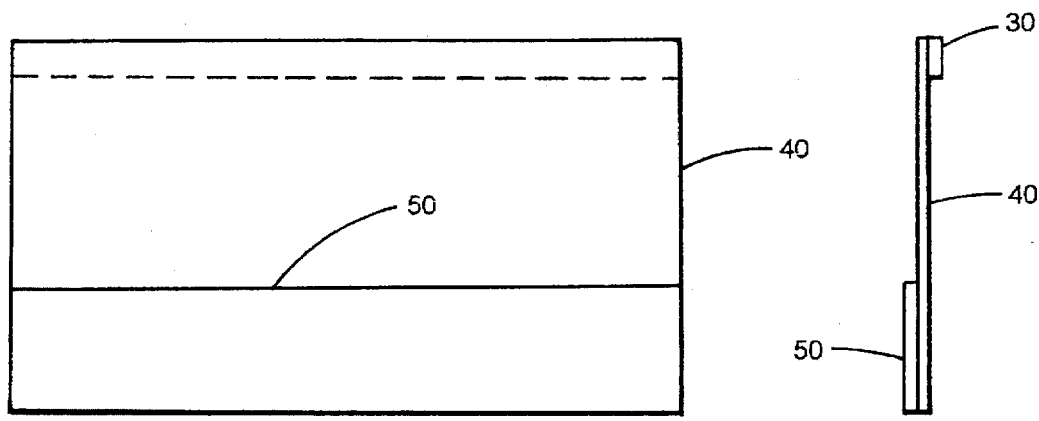
FIG. 3
FIG. 4

SUPPLEMENTARY SUN SHADE

BACKGROUND—FIELD OF THE INVENTION

This invention relates to a vehicle sun shade assembly for blocking direct sunlight to the operator while attached to the installed vehicle sun visor, more importantly, the present invention relates to a sun shade that is of sufficient size to be placed between the vehicle operator and the direct rays of the sun permitting an almost unobstructed view of the local environment.

BACKGROUND—DESCRIPTION OF PRIOR ART

The prior art is already aware of supplementary sun shades which are in use, both as automobile original equipment and as subsequent add-on attachments.

Heretofore, auxiliary or supplementary sun shades or glare shields have been utilized for purposes of glare reduction, accessory holders, mirrors and the like. One example of an auxiliary sun visor attachment is disclosed in U.S. Pat. No. 5,356,192 which discloses a light screening device which clamps to the vehicle sun visor with the screen both pivoting and sliding laterally on the clamping mechanism.

Another example of an auxiliary glare shield is disclosed in U.S. Pat. No. 3,954,297 which discloses a light screening device attaching to the vehicle sun visor with a clip assembly which pivotally supports the glare shield.

Numerous other disclosures in this field include shields retracting either horizontally or vertically into storage assemblies, shields having strap mounting attachments, and shields pivoting on the mounting attachment about a vertical axis.

Many common sun shades or glare shields suffer the drawbacks of difficult full range adjustment and/or a tendency to obstruct the operators view either by large support mechanisms or by physical size of the shield. Some of these units are also cumbersome and inconvenient to use.

SUMMARY OF THE INVENTION

The supplementary sun shade assembly of the present invention grips the vehicle sun visor on contact at any point laterally and may be easily adjusted to accommodate changes in the vehicle direction of travel.

The supplementary sun shade assembly of this invention includes a strip of hooked fastening tape extending laterally across the top edge of a flexible sun blocking panel and which grips the vehicle sun visor. An additional strip of less flexible material extends laterally across the lower edge of the flexible sun blocking panel providing rigidity and adding weight to aid in holding the sun shade assembly vertical when deployed. When in use, the sun shade hangs freely and is easily moved laterally for adjustment of position as the vehicle changes direction by detaching the hooked fastening tape from the vehicle sun visor and moving the entire assembly.

It is an object of the present invention to provide a supplementary sun shade which is easily installed and easily adjusted laterally on the vehicle sun visor for different operating conditions.

It is another object of the present invention to provide a supplementary sun shade of a minimum size to allow optimum operator view of the local environment without excessive shade adjustment, being generally 5 inches in the horizontal dimension and 3 inches in the vertical dimension as measured in the deployed position.

BRIEF DESCRIPTION OF THE DRAWINGS

FIG. 1 is a partial perspective view of the left side of a motor vehicle windshield as viewed by the operator with the supplementary sun shade shown in a deployed position, which may be at any point along the vehicle sun visor.

FIG. 2 is a partial elevation view of the forward edge of the vehicle sun visor as illustrated in FIG. 1 with the supplementary sun shade shown attached in the deployed position.

FIG. 3 is a front elevation view of the supplementary sun shade.

FIG. 4 is a side elevation view of the supplementary sun shade.

DESCRIPTION OF THE PREFERRED EMBODIMENTS

The supplementary sun shade assembly 20 as shown in FIG. 1 will attach to a vehicle sun visor 60 at any point having exposed fabric material. This is accomplished by a strip of hooked fastening tape 30 which extends laterally across the top edge of the sun shade assembly 20. The sun blocking panel 40 is flexible and hangs freely from the vehicle sun visor, and is optimally 5 inches in the horizontal dimension and 3 inches in the vertical dimension as measured in the deployed position. An additional strip of less flexible material 50 extending laterally across the lower edge of the supplementary sun shade assembly holds the desired shape and adds a small amount of weight to aid in maintaining the vertical attitude of the assembly while deployed.

What is claimed is:

1. A supplementary sun shade assembly to be attached to a vehicle sun visor for blocking direct sunlight to an operator's vision, the assembly comprising:

an attaching strip extending laterally across a top edge of the sun shade assembly for gripping the vehicle sun visor, a sun blocking panel having a generally rectangular shape for blocking the direct sunlight in a deployed position, and a strip of less flexible material extending laterally across a lower edge of the supplementary sun shade assembly opposite the attaching strip.

2. The supplementary sun shade assembly defined in claim 1, wherein the attaching strip is comprised of hooked fastening tape extending laterally across a upper edge of the sun blocking panel for gripping the vehicle sun visor.

3. The supplementary sun shade assembly defined in claim 1, wherein the said sun blocking panel is generally 5 inches in lateral dimension and 3 inches in vertical dimension as measured in the deployed position.

4. The supplementary sun shade assembly defined in claim 3, wherein the sun blocking panel is of a flexible material which allows the assembly to remain in a generally vertical attitude while deployed in various positions on the vehicle sun visor.

5. The supplementary sun shade assembly defined in claim 1, wherein the strip of less flexible material extends laterally across a lower edge of the sun blocking panel for maintaining shape and vertical orientation of the panel when in deployed position.

* * * * *